(12) United States Patent
Birkholz et al.

(10) Patent No.: US 12,401,099 B2
(45) Date of Patent: Aug. 26, 2025

(54) CELL UNIT, ENERGY STORAGE MODULE AND METHOD FOR THE ASSEMBLY THEREOF

(71) Applicant: Clarios Advanced Solutions GmbH, Hannover / Niedersachsen (DE)

(72) Inventors: Joerg Birkholz, Sarstedt (DE); Marco Jansen, Celle (DE); Henning Eisermann, Uetze (DE); Ralf Joswig, Buchholz (DE); Benjamin Schwarzien, Gehrden (DE); Martin Wiegmann, Borstel (DE)

(73) Assignee: Clarios Advanced Solutions GmbH, Hannover (DE)

( * ) Notice: Subject to any disclaimer, the term of this patent is extended or adjusted under 35 U.S.C. 154(b) by 422 days.

(21) Appl. No.: 17/724,675

(22) Filed: Apr. 20, 2022

(65) Prior Publication Data

US 2022/0247042 A1    Aug. 4, 2022

Related U.S. Application Data

(63) Continuation of application No. 16/616,552, filed as application No. PCT/EP2018/064509 on Jun. 1, 2018, now Pat. No. 11,342,638.

(Continued)

(51) Int. Cl.
*H01M 10/00*    (2006.01)
*H01M 10/48*    (2006.01)
(Continued)

(52) U.S. Cl.
CPC ....... *H01M 50/553* (2021.01); *H01M 10/486* (2013.01); *H01M 50/211* (2021.01);
(Continued)

(58) Field of Classification Search
CPC ............ H01M 50/553; H01M 10/486; H01M 50/211; H01M 50/227; H01M 50/249;
(Continued)

(56) References Cited

U.S. PATENT DOCUMENTS 9,225,035 B1    12/2015  Werre et al.
2015/0037642 A1*   2/2015  Pinon ................. H01M 50/517
                                                    429/99

(Continued)

FOREIGN PATENT DOCUMENTS

CN       101911336 A     12/2010
CN       104979503 A     10/2015
(Continued)

OTHER PUBLICATIONS

International Search Report and Written Opinion of the International Searching Authority with English Translation dated Feb. 26, 2019 issued in PCT Application No. PCT/EP2018/064509, consisting of 37 pages.

*Primary Examiner* — Nicholas P D'Aniello
(74) *Attorney, Agent, or Firm* — Weisberg I.P. Law, P.A.

(57) ABSTRACT

The invention relates to an electrochemical cell unit for storing electrical energy, in which the electrochemical cell unit includes at least two lithium-ion pouch cells, a planar element for orienting the at least two lithium-ion pouch cells, and a cell carrier. The at least two lithium-ion pouch cells are provided in the cell carrier and are in electrical contact. The at least two lithium-ion pouch cells also have a first and a second terminal lug. The planar element is provided, preferably centrally, in the cell carrier and in addition, is sandwiched between the at least two lithium-ion pouch cells, at least some portions of the planar element being in contact with the pouch cells.

17 Claims, 5 Drawing Sheets

Related U.S. Application Data

(60) Provisional application No. 62/513,597, filed on Jun. 1, 2017.

(51) Int. Cl.

| | | |
|---|---|---|
| *H01M 50/211* | (2021.01) | |
| *H01M 50/227* | (2021.01) | |
| *H01M 50/249* | (2021.01) | |
| *H01M 50/262* | (2021.01) | |
| *H01M 50/271* | (2021.01) | |
| *H01M 50/284* | (2021.01) | |
| *H01M 50/291* | (2021.01) | |
| *H01M 50/507* | (2021.01) | |
| *H01M 50/516* | (2021.01) | |
| *H01M 50/522* | (2021.01) | |
| *H01M 50/553* | (2021.01) | |
| *H01M 50/566* | (2021.01) | |

(52) U.S. Cl.
CPC ....... *H01M 50/227* (2021.01); *H01M 50/249* (2021.01); *H01M 50/262* (2021.01); *H01M 50/271* (2021.01); *H01M 50/284* (2021.01); *H01M 50/291* (2021.01); *H01M 50/507* (2021.01); *H01M 50/516* (2021.01); *H01M 50/522* (2021.01); *H01M 50/566* (2021.01); *H01M 2220/20* (2013.01)

(58) Field of Classification Search
CPC ............. H01M 50/262; H01M 50/271; H01M 50/284; H01M 50/291; H01M 50/507; H01M 50/516; H01M 50/522; H01M 50/566; H01M 2220/20; Y02E 60/10
See application file for complete search history.

(56) References Cited

U.S. PATENT DOCUMENTS

| | | | |
|---|---|---|---|
| 2015/0069829 A1 | 3/2015 | Dulle et al. | |
| 2015/0136840 A1* | 5/2015 | Zhao | H01M 50/54 228/160 |
| 2016/0133898 A1 | 5/2016 | Choi et al. | |
| 2017/0125774 A1* | 5/2017 | Choi | H01M 50/211 |
| 2018/0315977 A1* | 11/2018 | Park | H01M 50/503 |

FOREIGN PATENT DOCUMENTS

| | | |
|---|---|---|
| CN | 204747845 U | 11/2015 |
| CN | 105518476 A | 4/2016 |
| EP | 3002804 A1 | 4/2016 |
| KR | 20110093163 A | 8/2011 |
| WO | 2009057894 A1 | 5/2009 |
| WO | 2010031857 A2 | 3/2010 |
| WO | 2015016974 A1 | 2/2015 |
| WO | 2015035023 A1 | 3/2015 |
| WO | 2018065580 A1 | 4/2018 |

* cited by examiner

CELL UNIT, ENERGY STORAGE MODULE AND METHOD FOR THE ASSEMBLY THEREOF

CROSS-REFERENCE TO RELATED APPLICATIONS

This application is a Continuation of U.S. patent application Ser. No. 16/616,552, filed on Nov. 25, 2019, which is Submission Under 35 U.S.C. § 371 for U.S. National Stage Patent Application of International Application No.: PCT/EP2018/064509, filed Jun. 1, 2018 entitled "ELECTROCHEMICAL CELL UNIT, ENERGY STORAGE MODULE AND METHOD FOR THE ASSEMBLY THEREOF," which claims priority to U.S. Provisional Application No. 62/513,597, filed Jun. 1, 2017, entitled "12V LITHIUM-ION STARTER BATTERY," the entireties of all of which are incorporated herein by reference.

The present invention relates to an electrochemical cell unit as well as to an energy storage module according to the subject matter of the first and the ninth patent claims. The invention furthermore relates to a method for assembling an energy storage module.

Electrochemical cell units and energy storage modules of this type are used in many sectors of engineering. In particular, the present invention relates to the sector of electrochemical cell units and energy storage modules for vehicles, wherein a vehicle can be an aircraft or water craft, a rail-bound vehicle, an off-road vehicle or preferably an on-road vehicle. Road vehicles means especially passenger vehicles, trucks, buses or motor homes. Different types of battery modules are installed in vehicles, including traction batteries (especially in the case of electric vehicles) and starter batteries (automobile batteries). More specifically, at least one electrochemical cell unit as well as a starter battery is to be defined in particular in that said electrochemical cell unit and said starter battery provides at least a proportion of the energy, preferably the entire energy, which is required for starting a vehicle and/or for supplying vehicle on-board systems (lights, pumps, ignition). Lead accumulators are generally used as starter batteries, but these have a high weight, particularly because of their low energy densities. Lithium-ion accumulators, by contrast, have a high energy density. Moreover, lithium-ion accumulators have, for example, a longer service life, lower spontaneous discharge, improved capacity for quick charging and shorter maintenance intervals than conventional lead accumulators.

Overall, particularly due to the rising number of energy consumers, ever greater demands are being made on the performance, weight, reliability and production costs of cell units and battery modules in vehicles.

The invention is therefore based on the object of designing a cell unit as well as an energy storage module so as to be more economical in terms of mass production, in particular large-scale mass production, in particular with a view to automated manufacturing processes in applications in the field of automotive engineering. It is furthermore an object of the present invention to design an energy storage module in such a way that, on the one hand, it can expediently be used in modular production processes and that, on the other hand, it is particularly well-suited for subsequent use in vehicles. Moreover, a battery storage module is to be adaptable to various energy or output requirements, respectively, by simply adding or omitting cell units. The intention is furthermore to specify an improved method for assembling such energy storage modules which is more reliable in terms of process technology.

Accordingly, an electrochemical cell unit which has at least two lithium-ion pouch cells, a planar element for orienting the at least two lithium-ion pouch cells, and a cell carrier is specified according to the invention. The at least two lithium-ion pouch cells herein are disposed in the cell carrier and are in mutual electrical contact. The at least two lithium-ion pouch cells have a first and a second terminal lug. The planar element herein is disposed so as to be preferably centric in the cell carrier and furthermore is surrounded so as to be sandwiched between the at least two lithium-ion pouch cells and is at least in regions in contact with said lithium-ion pouch cells.

The term "electrochemical cell unit" and the abbreviated form "cell unit" are used synonymously. Furthermore, the term "lithium-ion pouch cell" and the abbreviated form "pouch cell" are likewise used synonymously.

On account of the proposal according to the invention to configure the electrochemical cell unit in such a manner that the at least two lithium-ion pouch cells are disposed in the cell carrier and surround a planar element which is disposed so as to be centric in the cell carrier so as to be sandwiched between said at least two lithium-ion pouch cells, an extremely compact construction mode of the cell unit is achieved which is capable of being implemented simply and by a few standard components. Moreover, a reliable planar disposal of the elements in the cell carrier is guaranteed by the sandwich-type disposal of the lithium-ion pouch cells around the planar element positioned so as to be centric in the cell carrier such that production tolerances set for the cell unit can be reliably adhered to. Planar in this context means that the elements, in particular mutually contiguous elements, are oriented so as to be mutually planar, or oriented so as to lie flat on one another.

According to one further aspect of the invention, the first and the second terminal lugs of the at least two lithium-ion pouch cells are configured so as to be planar and extend at least so as to be substantially perpendicular from two opposite sides of the at least two lithium-ion pouch cells. On account thereof, the compact construction mode of the cell units is additionally facilitated and an extremely advantageous contacting possibility specified.

In this context, from one side of the cell pack in a substantially perpendicular manner means that the angle between the side of the cell pack and the respective terminal lug is within a range of 70 degrees to 110 degrees, preferably within a range of 80 degrees to 100 degrees, and particularly preferably within a range of 85 degrees to 95 degrees. In particular, there is of course an extremely great preference in this context for the angle to be 90 degrees.

According to one further aspect of the invention, the first and the second terminal lug of the at least two lithium-ion pouch cells are flexural. On account thereof, a particularly simple and rapid possibility of electrically interconnecting cell units can be implemented in a later operating step. This furthermore offers in particular the further advantage that a relatively large contact face is provided which enables reliable contact across a large area.

According to one further aspect of the invention, the at least two lithium-ion pouch cells can be wired in series or in parallel such that, with a view to a later use of the cell units in an energy storage module, this results in the advantage of flexibly adapting the cell units to application parameters of the energy storage module.

According to one further aspect of the invention, the planar element is at least in portions connected to the at least two lithium-ion pouch cells by way of an adhesive layer. Taking into account the sandwich-type disposal of the lithium-ion pouch cells around the planar element in the cell carrier, the planar orientation of the elements in the cell unit and the adherence to production tolerances is additionally improved on account of the adhesive-bonding in regions.

In order for the planar element to be adhesively bonded to the at least two lithium-ion pouch cells, according to one further aspect of the invention an acrylic adhesive, an epoxy adhesive, and/or a double-sided adhesive tape are/is utilized. However, a use of further adhesives which meet the requirements in terms of the adhesive bonding is not precluded.

According to one further aspect of the invention, the planar element has a temperature sensor. On account thereof it is possible to reliably check the temperature profile of the cell units in operation such that measures can be taken in the event of irregularities and/or anomalies in the temperature profile.

According to one further aspect of the invention, the planar element is made from a metal or a metal alloy. The use of a metal or a metal alloy for configuring the planar element advantageously ensures that the planar disposal of the elements in the cell unit can be guaranteed even in the event of temperature variations. A thermal conduction by way of the planar element can be additionally achieved such that the planar element functions as a thermal conductor element.

The object mentioned at the outset is moreover achieved according to independent claim 9 by an energy storage module which has a multiplicity of electrochemical cell units according to the invention, an energy storage control installation for controlling the operation of the energy storage, at least two flexible busbar connectors, a shunt, and at least one contacting device for electrically contacting the multiplicity of electrochemical cell units. The energy storage control installation herein has a circuit board. The multiplicity of electrochemical cell units are disposed in a stacked manner such that said multiplicity of electrochemical cell units configure a cell pack. Furthermore, the multiplicity of electrochemical cell units are at least in part electrically interconnected. The shunt has a first surface and a second surface, wherein the first surface of the shunt at least in regions is in contact with the at least two flexible busbar connectors, and the second surface is at least in regions in contact with the circuit board of the energy storage control installation.

The energy storage module is preferably a starter battery for a vehicle, wherein the electrochemical cell units have lithium-ion pouch cells, on account of which the comparative advantages mentioned at the outset of lithium-ion accumulators in relation to lead accumulators are implemented.

On account of the proposal according to the invention to dispose the multiplicity of electrochemical cell units in stacked manner such that said multiplicity of electrochemical cell units configure a cell pack, an extremely compact construction of the energy storage module is enabled. Moreover, the number of common components is increased, this significantly lowering the production costs of the energy storage module. These advantages are furthermore facilitated by the shunt which has a first surface and a second surface, wherein the first surface of the shunt at least in regions is in contact with the at least two flexible busbar connectors, and the second surface is at least in regions in contact with the circuit board of the energy storage control installation. Contacting the shunt on two surfaces permits the disposal of the shunt between the energy storage control installation and the at least two busbar connectors in such a manner that the shut is in direct contact with these elements of the energy storage module. A complicated connection of the shunt to the elements by way of adapters and/or plug connectors which require a lot of installation space is prevented on account thereof.

According to one further aspect of the invention, the first and the second surface of the shunt are connected to the at least two flexible busbar connectors and the circuit board of the energy storage installation by means of a weld seam, preferably by means of a laser weld seam and/or an ultrasound weld seam. A targeted, locally established mutual connection of extremely high quality of the elements is achieved on account thereof, without using additional material or components which would introduce additional weight into the energy storage module and require additional installation space. A further advantage of a connection by means of a weld seam, preferably a laser weld seam and/or an ultrasound weld seam, lies in increasing the degree of automation in the production of the energy storage module.

According to one further aspect of the invention, a first flexible busbar connector of the at least two flexible busbar connectors is electrically connected to a terminal clamp of the energy storage module, and a second flexible busbar connector of the at least two flexible busbar connectors is connected to the cell pack.

According to one advantageous refinement of the invention, the at least one contacting device is configured so as to be substantially comb-shaped and has a multiplicity of teeth. Furthermore, each of the first and second terminal lugs is received between two neighboring teeth of the at least one contacting device.

It is thus possible to electrically connect each individual one of the terminal lugs to the contacting device in a subsequent working step. The proposal according to the invention thus makes available particularly rapid and efficient assembly of an energy storage module, in particular on account of the fact that the comb-shaped contacting device can be push-fitted onto the terminal lugs of the electrochemical cells. It is therefore possible with just a few movements to assemble the energy storage module or prepare it for a subsequent assembly step.

Furthermore, the teeth interact with the terminal lugs as a kind of centering device and thus further facilitate assembly. Of course, it is conceivable in this context for further centering devices to be provided, in particular on the contacting device.

Further advantages are also obtained by the fact that, when using lithium-ion pouch cells, said pouch cells can be configured so as to directly form a cell pack. This means that it is no longer necessary, for example, to connect a plurality of lithium-ion pouch cells by a preceding assembly step. In particular, the use of the energy storage module is thereby also made more universal overall since the individual cells or the terminal lugs thereof can be aligned differently relative to one another. It is thus not necessary to determine in advance whether series or parallel connection of individual cells should be achieved.

Overall, both the costs and the cycle time for production fall significantly. In this context, cycle time means the period of time which passes during the production of a product between the start of the first work process and the conclusion of the last work process.

According to an advantageous development of the invention, the at least one contacting device has at least one busbar and at least one carrier, wherein the at least one busbar and the at least one carrier are configured so as to be comb-shaped and have the multiplicity of teeth.

Thus, the contacting device is likewise of modular construction, further increasing the modularity of the overall system since different busbars can be installed. More possibilities for assembly (the number of variants rises) and, at the same time, less restriction (decisions in advance) thus arise.

Furthermore, the stability of the contacting device is increased by the at least one carrier, which can also have further centering or installation aids.

A separation of functions is furthermore aimed at by the proposal according to the invention, to construct the contacting device from at least one busbar and at least one carrier. In this respect, the at least one busbar performs the function of an electrical contacting, and the at least one carrier performs the function of a holding or of a fastening and/or of a centering or positioning unit.

It is thereby possible, in particular, to design or configure the contacting device in such a way that only the at least one busbar is formed from electrically conductive material, whereas the contacting device can be formed from an electrically non-conductive material. It is thus possible to separate current-carrying regions from regions which do not carry a current. Examples of materials that can be considered here for the at least one carrier are an acrylonitrile butadiene styrene, a polycarbonate, a polyamide, polyvinyl chloride, polyethylene terephthalate, polyoxymethylene or a copolymer thereof.

According to an advantageous development of the invention, the at least one busbar can be received or is received in the at least one carrier and/or can be fastened or is fastened thereon.

Thus, assembly is further simplified, especially if the at least one carrier has defined regions in which the at least one busbar can be received. Such regions can be implemented by means of an outer contour of the carrier and/or by means of webs, for example. In particular, it is thus also ensured that the busbar is connected to the at least one carrier in a particular and envisaged manner. Joining means, in particular adhesives, preferably those in the form of adhesive strips, are for example suitable for fastening.

According to one further aspect of the invention, the cell pack has two end plates, which are provided at both ends of the multiplicity of electrochemical cell units disposed in a stacked manner. On account thereof, a front end, or a rear end, respectively, of the cell pack is configured, said front end, or rear end, respectively, protecting the cell pack in relation to external stresses acting on the end faces of the cell pack.

The end plates are preferably made from plastic, in particular from acrylonitrile butadiene styrene, polycarbonate, polyamide, polyvinyl chloride, polyethylene terephthalate, polyoxymethylene or a copolymer thereof.

According to one advantageous refinement of the invention, the end plates have bores which are disposed and oriented so as to be aligned with bores of the multiplicity of electrochemical cell units, wherein the cell pack furthermore has multiplicity of rods which can be guided, or are guided, respectively, through the bores of the multiplicity of electrochemical cell units and through the bores of the end plates so as to connect said electrochemical cell units and said end plates, that is to say that the multiplicity of rods are plug-fitted through the bores.

Overall, an extremely stable and modular construction of the cell pack is thus formed. Here too, it is once again possible to provide for assembly of the cell pack at a separate workstation in order to further optimize the production sequence. For example, a multiplicity of the electrochemical cell units according to the invention can thus be made at a first work station, and the multiplicity of electrochemical cell units conjointly with the end plates can be connected so as to form a cell pack at a subsequent second work station, said cell pack then being able to be transferred onward to a third work station.

Four bores are preferably provided, or disposed, respectively, in each cell carrier and in each end plate, and said four bores are particularly preferably provided on the two sides of the cell pack from which the terminal lugs of the electrochemical cells do not extend; that is to say that two bores are in each case provided, or disposed, respectively, on an upper side and a lower side of the cell pack.

The described arrangement of the cell pack with a multiplicity of rods is also advantageous because the rods perform a centering function together with the bores.

The rods preferably have threads on the end regions thereof to enable fastening means to be screwed on.

According to one advantageous refinement of the invention, one foam board is in each case provided between external cell units, thus one front and one rear cell unit, of the multiplicity of electrochemical cell units disposed in a stacked manner and the end plates.

By means of the proposal according to the invention, it can be achieved that a contact pressure which is exerted by the end plates on the cell pack, or the electrochemical cell units, respectively, is uniformly distributed. Additionally, the foam boards have a damping effect, on account of which the cell pack and in particular the electrochemical cell units can be protected against vibrations and/or shocks.

The foam board is preferably fastened by means of an adhesive, wherein, as a particular preference, the foam boards are adhesively bonded to the end plates.

According to an advantageous development of the invention, the energy storage module furthermore has a module housing and a cover.

Here too, screws, bolts or rivets, in particular, are suitable fastening means for the module housing and the lid. In this context, the lid and/or the module housing are/is preferably connected to the end plates of the cell stack, which have bores or threaded bores for this purpose.

A multiplicity of devices is provided on the lid, e.g. connections for sensors used in the energy storage module, ventilation devices and terminals for contact with an electric consuming unit. The terminals for contact with an electric consuming unit are connected electrically to the connection region or connection regions of the at least one busbar.

The object mentioned at the outset is moreover achieved by a method for assembling an energy storage module, wherein the method comprises the following steps: providing a multiplicity of electrochemical cell units, wherein each of the multiplicity of electrochemical cell units has at least two lithium-ion pouch cells, a cell carrier, and a planar element for orienting the at least two lithium-ion pouch cells, and wherein each of the at least two lithium-ion pouch cells has a first and a second planar terminal lug; disposing a multiplicity of electrochemical cell units in a stacked manner so as to form a cell pack, wherein the first and the second terminal lugs are disposed on mutually opposite first and second sides of the cell pack; push-fitting at least one contacting device onto terminal lugs configured so as to be planar; bending the terminal lugs in such a manner that the multiplicity of electrochemical cell units can be electrically connected, or is electrically connected, to the at least one contacting device; welding the terminal lugs to the at least one contacting device while using a multi-part welding tool.

The proposal according to the invention of welding the terminal lugs to the at least one contacting device is advantageous in particular since a large contact area, or connection area, respectively, between the terminal lugs and the contacting device can be achieved within a short time span on account of the welding. Thus, welding can be used particularly effectively in automated production processes by virtue of the short processing time and, at the same time, is extremely reliable. Moreover, it is possible to dispense with further connecting components, e.g. screws, and the construction is furthermore simplified. The electric resistance in the case of a welded joint is also significantly lower than in the case of a joint provided by screws, for example.

Furthermore, a highly precise and mechanically reliable configuration of an electrically conductive connection between the terminal lugs configured so as to be planar and the contacting device is achieved on account of the use of a multi-part welding tool. The degree of automation and the stability of the process in the production of the energy storage module are increased on account thereof.

According to one further aspect of the invention, the multi-part welding tool (utilized in the method) has a receptacle device, an insulation plate, and a compression plate. On account of this three-part construction of the multi-part welding tool, the prefabricated cell pack while carrying out the welding process of the terminal lugs is fixed to the at least one contacting device in a positionally reliable manner. The highly precise and mechanically reliable configuration of an electrically conductive connection is thus additionally facilitated.

According to one further aspect of the invention, the receptacle device has a base plate having mutually spaced-apart position elements, wherein the position elements are disposed on the base plate in such a manner that the cell pack by way of the first or the second side facing the base plate can be received, or is received, respectively, in the receptacle device. On account of the disposal of the position elements on the base plate of the receptacle device, the exact shape of the cell pack (taking into account tolerances) is mirrored in the receptacle device such that any horizontal movement of the cell pack during the welding procedure is prevented.

The disposal of the cell pack by way of the first or the second side in the receptacle device moreover permits ready accessibility to be continuously guaranteed to the regions of the first and the second terminal lugs to be connected and to the at least one contact device. The first and the second side of the cell pack herein describe the mutually opposite sides of the cell pack on which the first and the second terminal lugs and the at least one contacting device are disposed.

According to one further aspect of the invention, the insulation plate at least in regions is positioned on the second or the first side of the cell pack, wherein the insulation plate has clearances which are oriented so as to be aligned with regions of the terminal lugs to be connected and with the at least one contacting device. On account of an insulation plate having clearances that are oriented so as to be aligned being used on the second or the first side of the cell pack, a protection of regions not to be welded of the elements disposed on the second or the first side of the cell pack is enabled. The elements are protected, for example, against a thermal input, or other influences initiated by the welding procedure.

Moreover, only the regions of the terminal lugs and of the at least one contacting device to be connected are rendered accessible by the clearances such that the process stability and the adherence to tolerances during the welding procedure are increased.

According to one further aspect of the invention, the insulation plate is made from a plastics material.

According to one further aspect of the invention, the compression plate is disposed and oriented on the insulation plate so as to be aligned with the latter, wherein the compression plate furthermore has clearances and is connected to the tensioning device by way of a screw connection. A disposal of the compression plate on the insulation plate of this type, and fixing of the compression plate by way of the receptacle device in this manner, enables the cell pack to be uniformly braced in a planar manner in the multi-part welding tool. Furthermore, a uniformly distributed direction of force into the cell pack takes place when bracing so that any damage to the cell pack and/or to individual cell units is avoided.

According to one further aspect of the invention, the compression plate is made from a metal or a metal alloy, preferably from aluminum or an aluminum alloy. On account thereof, it is guaranteed that the compression plate is not undesirably deformed in the bracing of the cell pack in the multi-part welding tool, on the one hand, and resists influences that arise in the welding procedure, on the other hand.

According to an advantageous development of the invention, the at least one contacting device has at least one busbar and at least one carrier, wherein the at least one busbar and the at least one carrier are configured so as to be comb-shaped and have the multiplicity of teeth.

According to one further aspect of the invention, the cell pack has two end plates, which are provided at both ends of the multiplicity of electrochemical cell units disposed in a stacked manner.

According to one further aspect of the invention, the welding of the terminal lugs to the at least one contacting device is carried out by means of a laser beam welding method. This results in the advantage that the thermal input into the contact region to be connected takes place in a highly concentrated and locally delimited manner. Moreover, the welding depth can advantageously be controlled such that, in combination with the previously mentioned advantage, a high-quality connection that in mechanical terms is extremely stable is achieved in the contact region.

The invention will be explained in more detail below by means of exemplary embodiments while using the appended drawings.

In the drawings:

FIG. 5b shows a schematic illustration of an assembled contacting device according to FIG. 3a;

Figure 1:
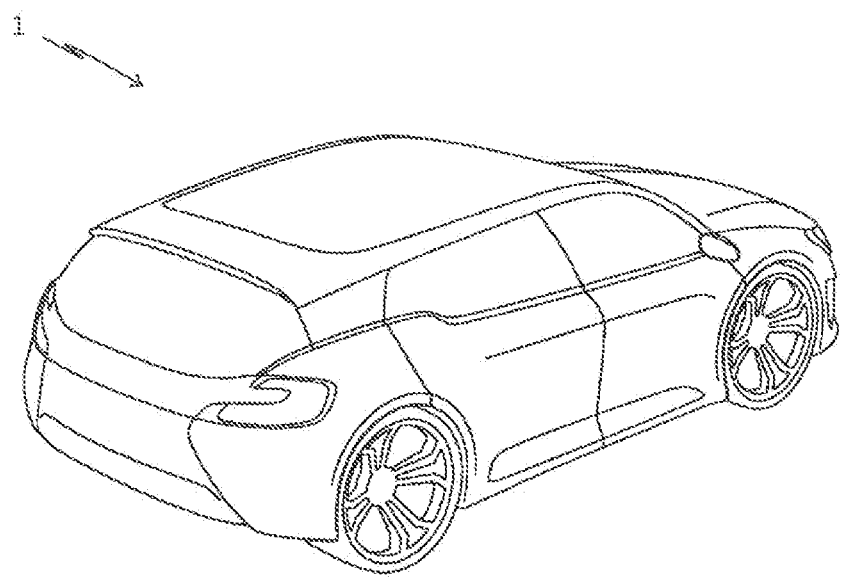
FIG. 1 shows a schematic illustration of a vehicle.

The cell unit according to the invention as well as the energy storage module according to the invention will be described in more detail hereunder with reference to the illustrations in the figures. Here, identical elements and functions of those having the same effect are provided with the same or similar reference characters.

The cell unit, the contacting device, and the energy storage module will be described hereunder in such a manner that relative terms refer to the installed state of the energy storage module. Thus, for example, "in an upper region" means in a region which is at the top when viewed in the installed state, and "in a lower region" means in a region which is at the bottom when viewed in the installed state.

FIG. 1 shows a schematic illustration of a vehicle 1. Here, an energy storage module 400 can in particular be disposed in a region of the vehicle 1 which is at the front in the direction of travel. The energy storage module 400 for storing electrical energy has a multiplicity of electrochemical cell units 10.

The vehicle 1 can be an aircraft or a water craft, a rail vehicle, an off-road vehicle, or preferably an on-road vehicle, wherein an on-road vehicle can mean a passenger vehicle, a truck, a bus, or a motor home.

The vehicle 1 is driven by a drive unit. The drive unit may be an internal combustion engine, an electric motor or a combination thereof. A vehicle 1 which has both an electric motor and an internal combustion engine is referred to as a hybrid vehicle. Particularly in the case of hybrid vehicles and vehicles that have an internal combustion engine, the energy storage module 400 can be provided as a starter battery.

Figure 2:
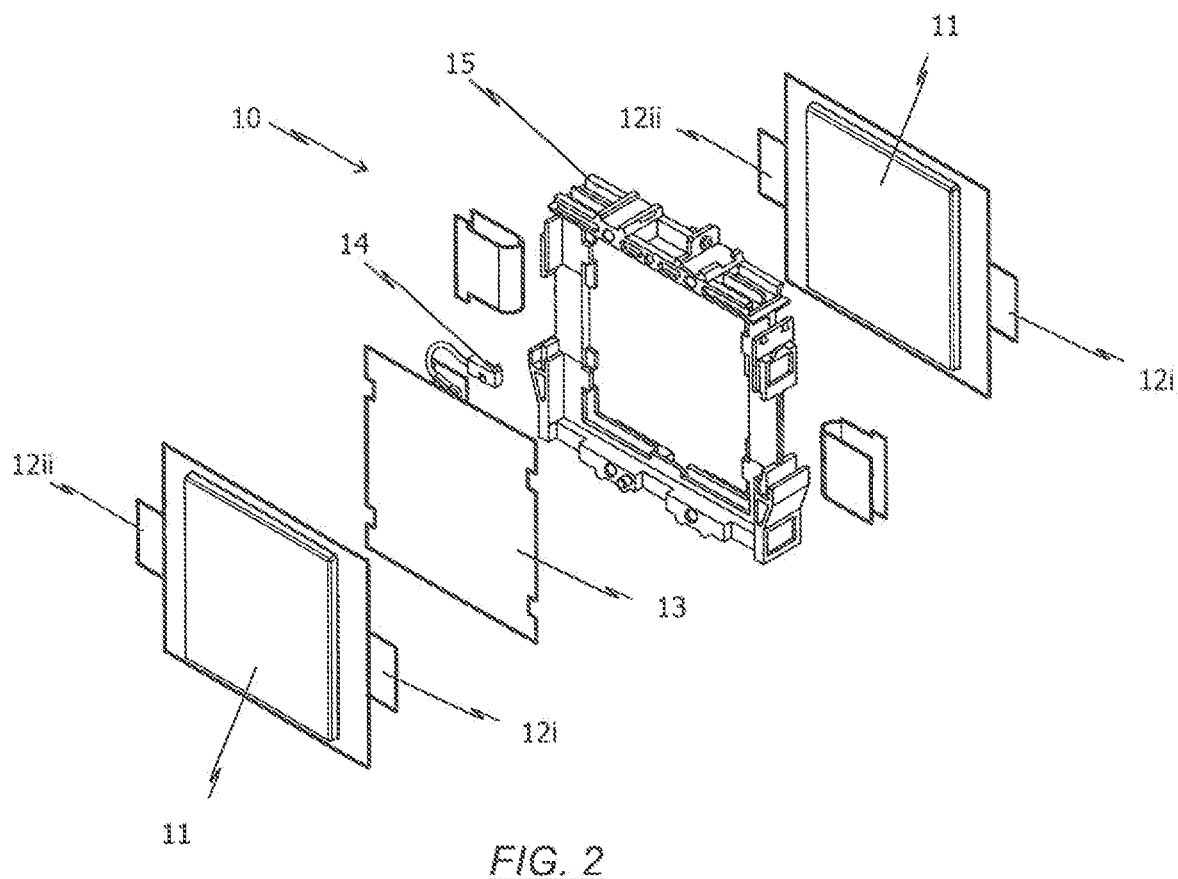
FIG. 2 shows a schematic illustration of an electrochemical cell unit according to the present invention.

FIG. 2 in an exemplary manner shows the electrochemical cell unit 10 according to the invention having two lithium-ion pouch cells 11. The two lithium-ion pouch cells 11 are disposed in a cell carrier 15, wherein the two lithium-ion pouch cells 11 are disposed on two mutually opposite sides of the cell carrier 15. The two lithium-ion pouch cells 11 furthermore have in each case one first terminal lug 12$i$ configured so as to be planar, and one second terminal lug 12$ii$ configured so as to be planar. The first and the second terminal lugs 12$i$, 12$ii$ configured so as to be planar herein extend from two opposite sides of the two lithium-ion pouch cells 11. The two sides are in particular the left side and the right side of the electrochemical cell unit 10.

Furthermore, a planar element 13 is disposed in the cell carrier 15 of the electrochemical cell unit 10 according to the invention. The planar element 13 is received, in particular so as to be centric, in a web of the cell carrier 15 in a central region. The planar element 13 and the cell carrier 15 have corresponding clearances, or convexities, respectively, for securely positioning the planar element 13 in the cell carrier 15.

The cell carrier 15 can be made from a plastics material, for example from acrylonitrile butadiene styrene, but other materials can however also be used. The planar element 13 can furthermore be made from a metal or a metal alloy such as, for example, an aluminum alloy; but the use of other materials is also possible here.

The planar element 13 is surrounded so as to be sandwiched between the two lithium-ion pouch cells 11 in the cell carrier 15. This means that the two lithium-ion pouch cells 11 are disposed on a first and a second end face of the planar element 13 and are in contact with said end face. A planar orientation of the two lithium-ion pouch cells 11 in the cell carrier 15, or in the cell unit 10, is thus advantageously provided. Planar in this context means that the elements, in particular the mutually contiguous elements, are oriented so as to be mutually planar, or oriented so as to lie flat on one another. The two lithium-ion pouch cells 11 can additionally be connected in regions, or in a contiguous planar manner, to the planar element 13 by way of an adhesive, for example an acrylic adhesive, an epoxy adhesive, or a double-sided adhesive tape. On account thereof, any displacement of the two lithium-ion pouch cells 11 from the planar orientation is prevented in subsequent manufacturing steps.

Moreover, a temperature sensor 14 can be attached to an upper side of the planar element 13. To this end, the planar element 13 on the upper side thereof can have an additional convexity which can be disposed in a further clearance of the cell carrier 15. The temperature sensor 14 serves for measuring temperatures, as well as for determining temperature profiles and temperature variations in the operation of the cell unit 10. The temperature sensor 14 can be connected to installations of a superordinate energy storage module 400.

Even though the electrochemical cell unit 10 in FIG. 2 is illustrated with reference to only two lithium-ion pouch cells 11, embodiments of the electrochemical cell unit 10 having three or more lithium-ion pouch cells 11 are conceivable. To this end, one or a plurality of additional planar elements 13 will have to be optionally disposed and oriented in the cell carrier 15.

Figure 3:
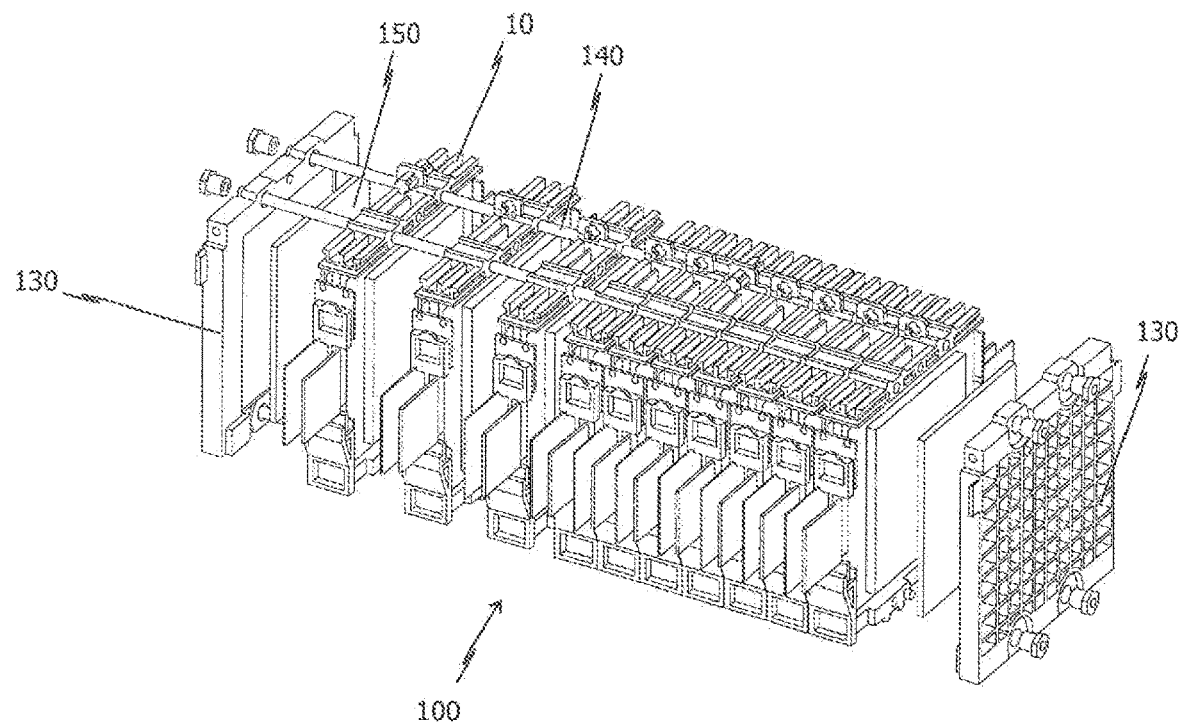
FIG. 3 shows a schematic illustration of cell pack according to the present invention.

FIG. 3 shows a cell pack 100 having a multiplicity of electrochemical cell units 10 according to the invention for use in the energy storage module 400 according to the invention. The electrochemical cell units 10 herein are disposed in such a way that the first terminal lugs 12$i$ configured so as to be planar, and the second terminal lugs 12$ii$ configured so as to be planar, of the lithium-ion pouch cells 11 extend from two opposite sides of the cell pack 100. In particular, the two sides are the left and the right side of the cell pack 100.

Rods 140 are provided on an upper and a lower side, said rods being received by, or guided through, respectively, bores in the cell carriers 15 of the multiplicity of electrochemical cell units 10 according to the invention.

End plates 130 are provided on a front and on a rear side of the cell pack 100, said end plates forming an end of the cell pack 100. The end plates 130 have associated bores, by which the rods 140 are received or through which they are passed. Foam boards 150 are disposed between the end plates 130 and a first, or last, respectively, of the multiplicity of electrochemical cell units 10 according to the invention.

As can likewise be seen in FIG. 3, the end plates 130 each have a clearance, which is designed in such a way in its shape and size that it can receive the foam board 150, at least in some region or regions. It is preferably possible to provide the clearance and/or the foam board 150 with an adhesive device, e.g. adhesive strips.

The assembly of the cell pack 100 can be performed while applying a force to the outwardly oriented end faces of the two end plates 130. The force to be applied is preferably between 100 Newton (N) and 400 Newton (N), but may also be chosen so as to deviate from these values, depending on the embodiment of the cell pack. On account thereof, a required minimum compression of the cell pack 100 can be guaranteed, said minimum compression guaranteeing, for example, a dissipation of heat from the cell pack 100, or a configuration of a sufficient stiffness of the cell pack 100.

Figure 4:
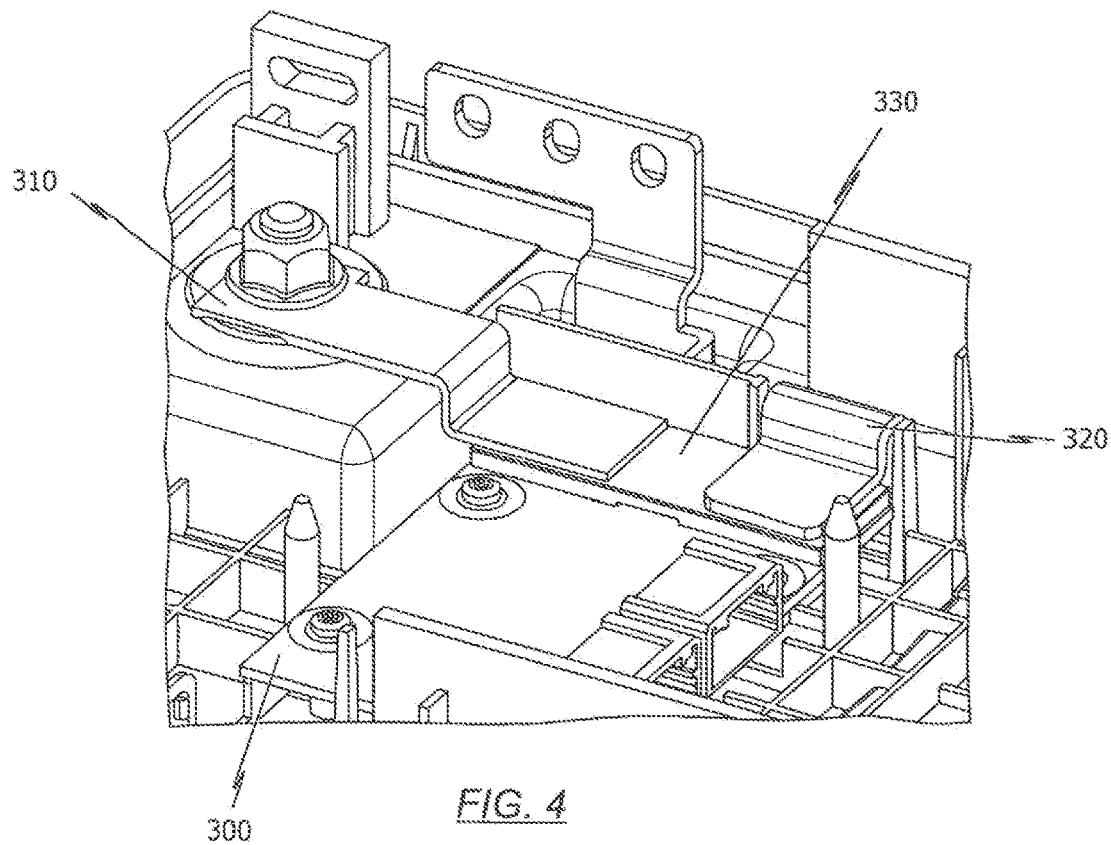
FIG. 4 shows a schematic illustration of electrical elements of the energy storage module according to the present invention.

FIG. 4 shows electrical elements of the energy storage module 400 according to the invention, such as an energy storage control installation 300, at least two flexible busbar connectors 310 and 320, as well as a shunt 330.

The energy storage control installation 300 serves for controlling the operation of the energy storage module 400 and has a circuit board. The at least two flexible busbar connectors 310 and 320 have a first flexible busbar connector 310 which is connected in an electrically conducting manner to a terminal clamp of the energy storage module 400, as well as a second flexible busbar connector 320 which is connected in an electrically conducting manner to the cell pack 100. The shunt 330 furthermore has a first and a second surface, wherein the first or a second surface is connected to the circuit board of the energy storage control installation 300, and the second or first surface is connected to the first and the second flexible busbar connector 310 and 320. On account thereof, an electrically conducting connection that saves a lot of installation space and is simple to produce can be implemented between the cell pack 100, the energy storage control installation 300, and a terminal clamp of the energy storage module 400.

The connection of the shunt 330 to the first and the second flexible busbar con-nector 310 and 320, as well as the connection of the shunt 330 to the circuit board of the energy storage control installation 300, are implemented by way of a welded connection. A laser beam welding method and/or an ultrasound welding method are/is advantageously utilized to this end. The connection of the shunt 330 to the flexible busbar connectors 310 and 320, and to the circuit board of the energy storage control installation 300 herein can be performed in regions or across the entire area.

Figure 5A:
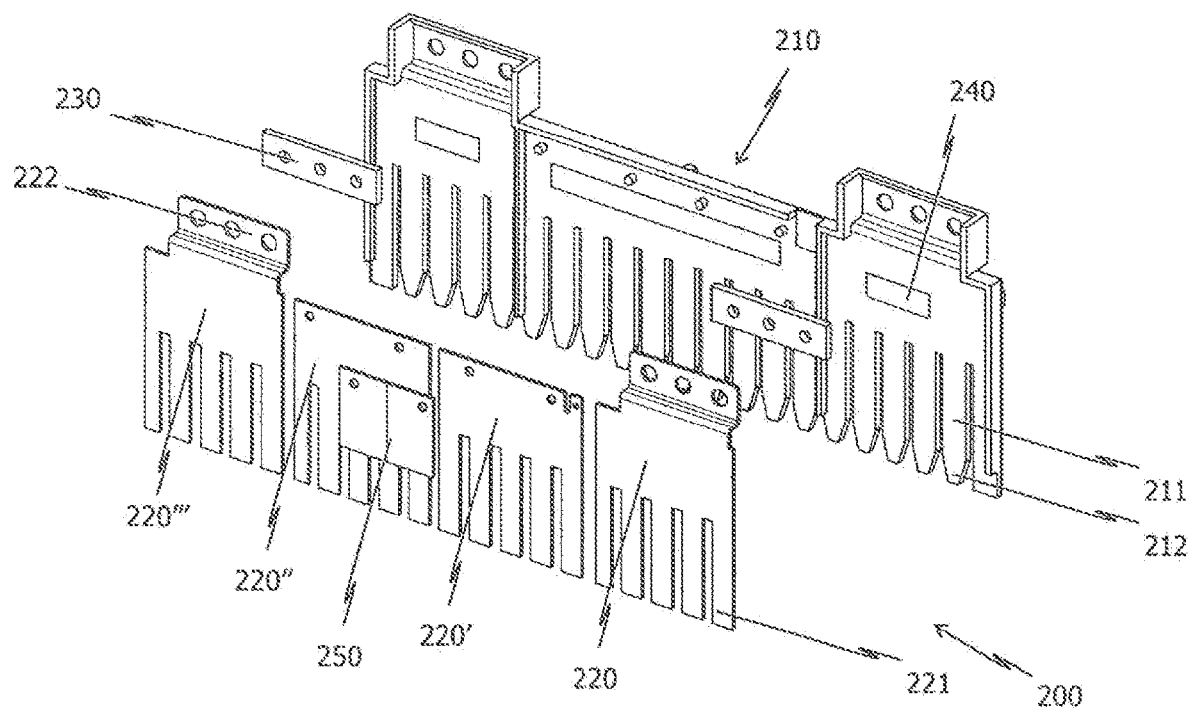
FIG. 5a shows an exploded drawing of a contacting device according to the present invention.

FIG. 5a shows an exploded drawing of a contacting device 200 according to the invention. The contacting device 200 has a carrier 210 and four busbars 220, 220', 220" and 220'". It is, of course, conceivable in this context for a different number of busbars 220 to be provided.

The carrier 210 has a multiplicity of teeth 211, which have chamfered end regions 212. It can furthermore be seen that the carrier 210 has centering devices in the form of knobs or pins, which can be received at least in associated bores in the two central busbars 220', 220".

The carrier 210 has three regions, which are separated by webs and thus provides three regions for the defined reception of the busbars 220, 220', 220" and 220'". In this case, a front busbar 220 is accommodated in a front region, the two central busbars 220' and 220'" are accommodated in a central region, and a rear busbar 220'" is accommodated in a rear region. Here too, relative terms such as "front" and "rear" refer to an installed state of the cell pack, or of the energy module, respectively.

The front region and the rear region of the carrier 210 have regions to enable a connection region 223 of the front and rear busbars 220 and 220'" to be received.

Moreover, each of the regions of the carrier 210 can have an adhesive strip 240 to enable the busbars 220, 220', 220" and 220'" to be connected to the carrier 210, i.e. to be secured thereon.

The busbars 220 shown in FIG. 5a each have a multiplicity of teeth 221. Moreover, the busbars 220 are manufactured from different materials. Thus, for example, the front busbar 220 is formed from aluminum, the adjoining, central busbar 220' is formed from copper, the other central busbar 220" is formed from aluminum, and the rear busbar 220'" is formed from copper.

To enable the central two busbars 220' and 220" to be connected in a preceding working step, a bimetallic plate 250 is preferably provided. The two materials aluminum and copper can be welded directly only with great effort, and therefore the bimetallic plate 250 is used, having a first side made of aluminum and a second side made of copper.

Instead of welding the busbars 220' and 220" directly, the side of the bimetallic plate 250 which is made of aluminum is thus welded to the busbar 220". In corresponding fashion the side of the bimetallic plate 250 which is formed from copper is welded to the busbar 220'.

Threaded plates 230 are provided between the busbars 220 and the carrier 210. In particular, the region of the carrier 210 which receives the connection regions 223 of busbars 220 and 220'" is also designed to be able to receive the threaded plate 230.

Figure 5B:
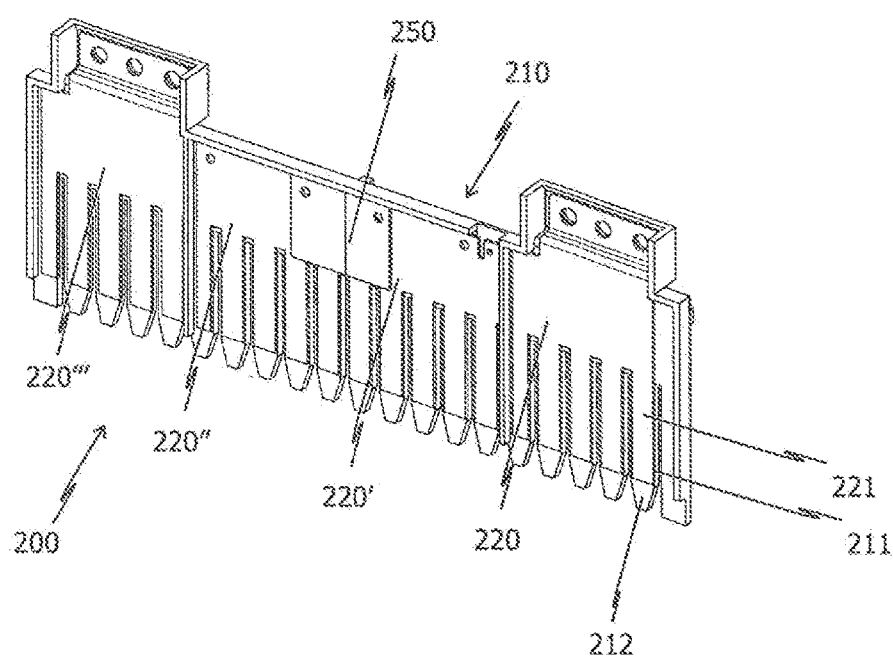

FIG. 5B shows the contacting device 200 according to FIG. 3a in an assembled state. As can be seen, the busbars 220, 220', 220", 220'" are received in the carrier 210. In particular, it can also be seen that the teeth 211 of the carrier 210 are of longer design than the teeth 221 of the busbars 220, 220', 220" and 220'". This offers the advantage that only the teeth 211 of the carrier 210 have to have chamfered end regions 212. Accordingly, the busbars 220, 220', 220" and 220'" or the teeth 221 thereof are easier to produce.

It can furthermore be seen that the webs of the carrier 210 between the front and the central as well as between the central and the rear region also serve to electrically isolate the busbars 220 and 220' and the busbars 220" and 220'", respectively, from one another.

Figure 6A:
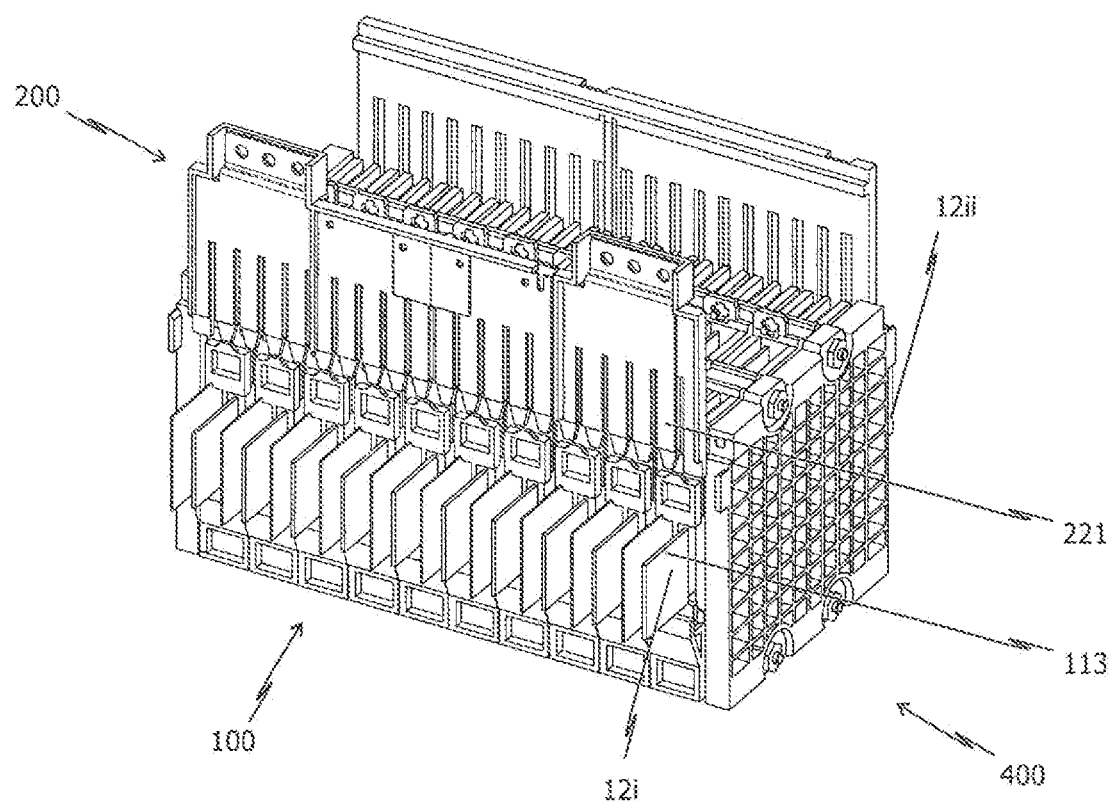
FIG. 6a shows a schematic illustration of an energy storage module according to the present invention in a first state.
Figure 6B:
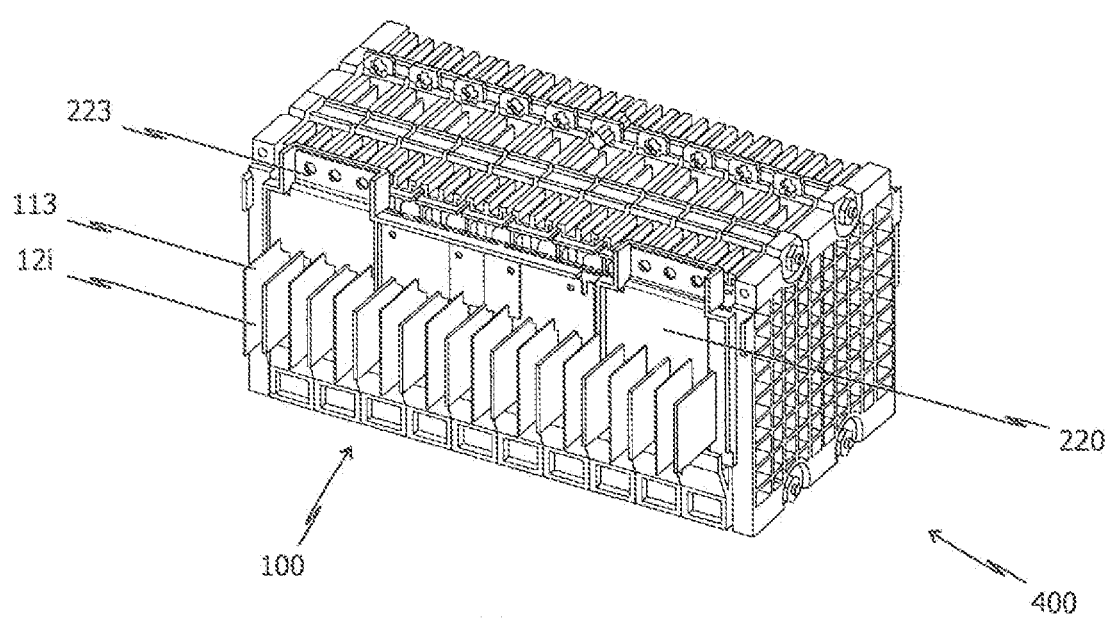
FIG. 6b shows a schematic illustration of the energy storage module according to FIG. 4a in a second state.
Figure 6C:
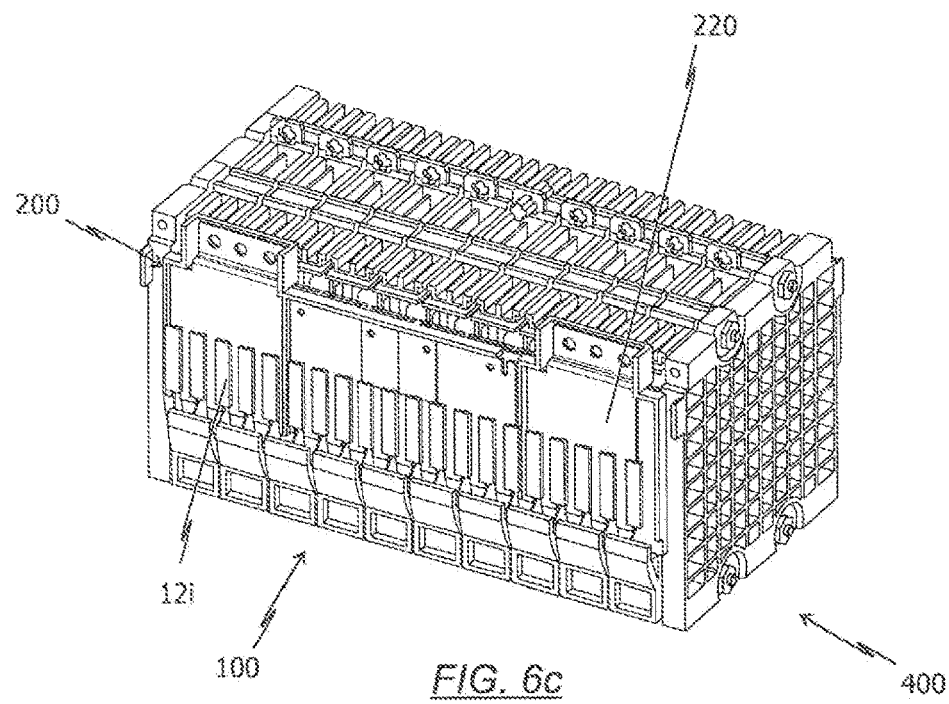
FIG. 6c shows a schematic illustration of the energy storage module according to FIG. 4a in a third state.

FIGS. 6a, 6b, and 6c show the energy storage module 10 in various production steps (states).

FIG. 6a thus shows the cell pack 100 and two contacting devices 200 before the push-fitting of contacting devices 200 thereon.

FIG. 6b shows the cell pack 100 and the contacting devices 200 in a push-fitted or plug-fitted state, respectively. It can be seen herein that the two contacting devices 200 are not, or do not have to be, of identical design, respectively. In particular, it can be seen that only one of the contacting devices 200 has the connection regions 223 of busbar 220 and 220'". Accordingly, the carrier 210 is formed either with or without regions for receiving the connection regions 223.

In FIG. 6a and FIG. 6b the first and the second terminal lugs 12i and 12ii, configured so as to be planar, of the lithium-ion pouch cells 11 still have a protective film 113 which is removed in an intermediate step between FIG. 6b and FIG. 6c.

The protective film 113 serves, in particular, to protect the surface of the terminal lugs 12i and 12ii.

In FIG. 6c it is possible to see the cell pack 100 and the contacting device 200, wherein the terminal lugs 12i and 12ii of the lithium-ion pouch cells 11 have been bent in such a manner that they allow electrical contact between the busbars 220, 220', 220" and 220'" and the electrochemical cells 10. In particular, it can also be seen that contact faces between the terminal lugs 12i and 12ii and the busbars 220, 220', 220" and 220'" are relatively large by virtue of the flat design of the terminal lugs 12i, 12ii.

Moreover, the cell pack 100, and therein in particular the end plates 130, have centering installations, as can be seen in FIG. 6a to FIG. 6c. These can be seen, in particular, on the end plates 130, in the form of projections extending toward the sides.

The contacting devices 200, in particular the carrier 210, also have/has centering installations which in FIG. 6a are illustrated, for example, in the form of stays which extend so as to be parallel with the teeth of the carrier.

The carrier 210, as can likewise be seen in FIG. 6a, in an upper region furthermore has a type of rail which can be fastened in upper regions of the cell carriers 15 of the multiplicity of electrochemical cell units 10 according to the invention. This is, in particular, a latching device.

In FIG. 6b it is moreover illustrated that the carrier 210 can be received in a lower region of the cell carriers 15 of the multiplicity of electrochemical cell units 10 according to the invention. This lower region can simultaneously form a detent to ensure that the contacting devices 200 can be push-fitted onto the terminal lugs 12i and 12ii only as far as a particular position.

The following successive method steps are to be applied in order for the energy storage module 400 according to the invention to be assembled:

First, the multiplicity of electrochemical cell units 10 according to the invention are provided. Thereafter, a disposal of the multiplicity of electrochemical cell units 10 according to the invention is performed in a stacked manner so as to form a cell pack 100. The cell pack herein is configured so as to correspond to the construction from FIG. 3. The first and the second terminal lugs 12i and 12ii herein are disposed on mutually opposite first and second sides of the cell pack 100.

In the next step, the at least one contacting device 200 is push-fitted onto the terminal lugs 12i and 12iii configured so as to be planar. Thereupon, the terminal lugs 12i, 12ii are bent, specifically in such a manner that the multiplicity of electrochemical cell units 10 according to the invention can be electrically connected, or is electrically connected, to the at least one contacting device 200. Subsequently, the terminal lugs 12i, 12ii are then welded to the at least one contacting device 200 while using a multi-part welding tool 500.

Figure 7:
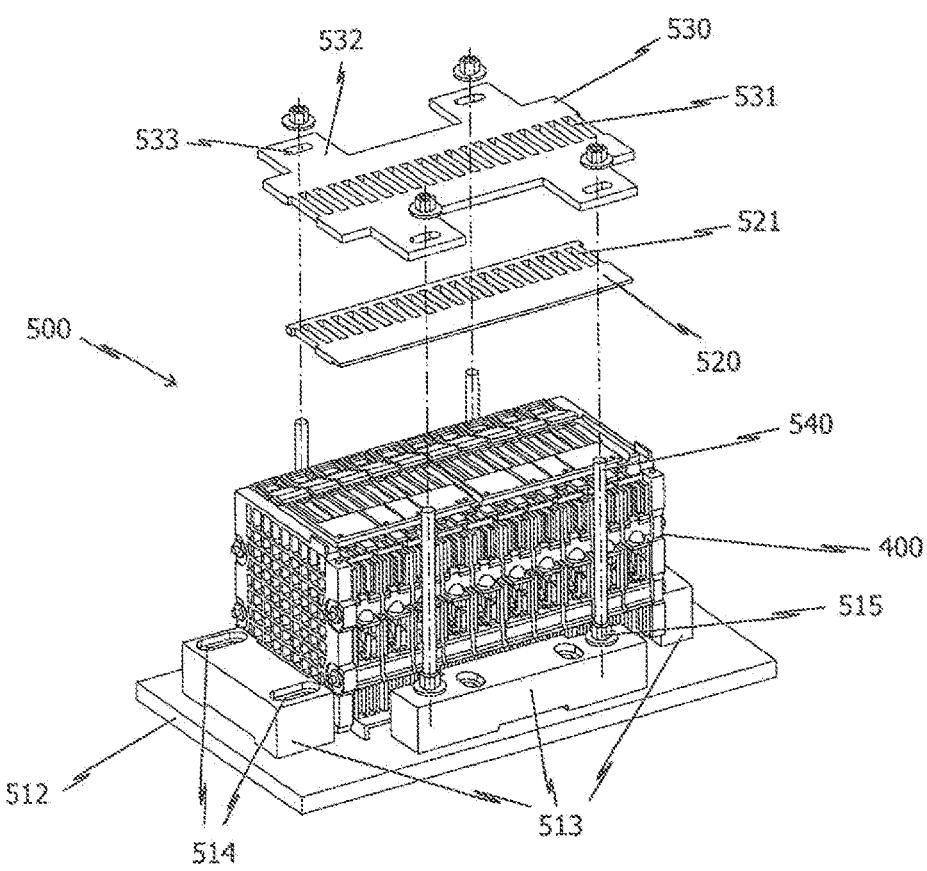
FIG. 7 shows a schematic illustration of the multi-part welding tool according to the present invention.

FIG. 7 shows the multi-part welding tool 500 utilized for the assembly of the energy storage module 400 according to the invention. The multi-part welding tool 500 is composed of three main elements: a receptacle device 510, an insulation plate 520, as well as a compression plate 530.

The receptacle device 510 has a base plate 512 having a first surface and a second surface, wherein position elements 513 are disposed on one of the first or the second surface. The position elements 513 preferably have a substantially cuboid shape, but may also have other geometric shapes. The position elements 513 are furthermore disposed so as to be mutually spaced apart on the base plate 512 of the receptacle device 510 such that a space which enables the cell pack 100 to be received in a lateral position is configured. A lateral position herein is a position in which the mutually opposite first and second sides of the cell pack 100 that comprise the first and the second terminal lugs 12i and 12ii are disposed in a horizontal plane.

In order for the position elements 513 to be fastened to the base plate 512, the position elements 512 and the base plate 513 can have first clearances 514 in which fastening elements such as, for example, screws, can be received. The orientation of the position elements 513 on the base plate 512 herein can take place so as to correspond to the construction of the cell pack 100. The position elements 513 can furthermore have second clearances 515 for receiving fastening elements 540 such as, for example, screws which are required for bracing the cell pack 100 in the multi-part welding tool 500.

The insulation plate 520 is positioned on that side of the cell pack 100 that lies opposite the side of the cell pack 100 that is received by the cavity. The insulation plate 520 herein is at least in regions or completely disposed on that side of the cell pack 100 that lies opposite the side of the cell pack 100 that is received by the cavity. The insulation plate 520 moreover has clearances 521 which are oriented so as to be aligned with the regions of the first and the second terminal lugs 12i and 12ii to be connected, configured in a planar manner, and with the at least one contacting device 200. It is guaranteed on account thereof that only those regions of the terminal lugs 12i and 12ii and of the contacting device 200 that are relevant to the electrically conducting connection are connected to one another by the welding procedure. Additionally, regions and/or elements of the cell pack 100, or of the energy storage module 400, are protected in relation to undesirable influences arising during the welding process.

The insulation plate 520 herein can preferably be made from a plastics material such as, for example, acrylonitrile butadiene styrene, but other materials can however also be utilized.

As can furthermore be seen in FIG. 7, the compression plate 530 is disposed on the insulation plate 520. The compression plate herein likewise has clearances 531 which are disposed and oriented so as to align with the clearances 521 of the insulation plate 520. The accessibility to the regions of the cell pack 100 to be welded is guaranteed on account thereof. The compression plate 530 on the lateral peripheral regions thereof moreover has convexities 532 which are provided with clearances 533. The clearances 533 of the convexities 532 are oriented so as to be vertically spaced apart from and to align with the clearances 515 of the position elements 513 such that the cell pack 100 is braced in relation to the multi-part welding tool 500 by way of fastening elements 540 which are received in the clearances 515 and 533 of the position elements 513 and the convexities 532 of the compression plate 530.

Positioning and bracing the cell pack 100 that acts counter to undesirable movements in the multi-part welding tool 500 can thus be achieved in a simple manner. Moreover, only the necessary regions of the cell pack 100, or of the energy storage module 400, are influenced by the welding process.

The compression plate 530 can be preferably made from a metal or a metal alloy such as, for example, aluminum or an aluminum alloy. Manufacturing the compression plate 530 from other materials is however likewise possible.

In order for the first and the second terminal lugs 12i and 12ii to be welded to the at least one contact device 200, a laser beam welding method which by way of suitable welding parameters advantageously facilitates the adherence to the high requirements set for the manufacturing process of the energy storage module 400 is preferably chosen.

At this point it should be noted that all the parts described above, viewed alone or in any combination, in particular the details shown in the drawings, are claimed as essential to the invention. Amendments thereto are entirely familiar to the person skilled in the art.

REFERENCE CHARACTER LIST

1 Vehicle
10 Electrochemical cell unit
11 Lithium-ion pouch cell
12i First terminal lug
12ii Second terminal lug
13 Planar element
14 Temperature sensor
15 Cell carrier
100 Cell pack
113 Protective film
130 End plate
140 Rods
150 Foam board
200 Contacting device
210 Carrier
211 Teeth of the carrier 212 Chamfered end region of the teeth
220 Busbar
220' Busbar
220" Busbar
220''' Busbar
212 Teeth of the busbar
223 Connection region
230 Threaded plate
240 Adhesive strip
250 Bimetallic plate
300 Energy storage control installation
310 First flexible busbar connector
320 Second flexible busbar connector
330 Shunt
400 Energy storage module
500 Multi-part welding tool
510 Receptacle device
512 Base plate
513 Position elements
514 First clearances
515 Second clearances
520 Insulation plate
521 Clearances
530 Compression plate
531 Clearances
532 Convexities
533 Clearances
540 Fastening elements

The invention claimed is:

1. A method for assembling an energy storage module comprising at least one contacting device and a plurality of electrochemical cell units, the at least one contacting device being comb-shaped and having a first plurality of teeth, the at least one contacting device having at least one busbar and at least one carrier, the at least one busbar and the at least one carrier being comb-shaped and having a second plurality of teeth and a third plurality of teeth, respectively, each electrochemical cell unit of the plurality of electrochemical cell units having at least two lithium-ion pouch cells, each of the at least two lithium-ion pouch cells having a first and a second terminal lug, each one of the first terminal lug and the second terminal lug having a first side and a second side opposite the first side, the method comprising:
 positioning the plurality of electrochemical cell units by placing at least one electrochemical cell unit next to another electrochemical cell unit to form a cell pack having a first side of the cell pack and a second side of the cell pack opposite to each other, the first terminal lug and the second terminal lug being on the first side and the second side of the cell pack, respectively;
 coupling the at least one busbar to the at least one carrier, each tooth of the second plurality of teeth being aligned with one tooth of the third plurality of teeth, each pair of aligned teeth of the second plurality of teeth and the third plurality of teeth corresponding to one tooth of the first plurality of teeth of the at least one contacting device;
 push-fitting the at least one contacting device onto the first terminal lug and the second terminal lug, the push-fitting including:
  receiving each of the first terminal lug and the second terminal lug between two neighboring teeth of the first plurality of teeth of the at least one contacting device, each of the first terminal lug and the second terminal lug contacting the corresponding two neighboring teeth of the first plurality of teeth; and
  electrically connecting each one of the first side and the second side of the first terminal lug and the second terminal lug to the at least one contacting device.

2. The method of claim 1, wherein the method further includes:
 bending the first terminal lug and the second terminal lug to electrically connect the first terminal lug and the second terminal lug to the at least one contacting device.

3. The method of claim 1, wherein the method further includes:
 welding at least one of the first terminal lug and the second terminal lug to the at least one contacting device using a multi-part welding tool.

4. The method of claim 3, wherein the welding is carried out using a laser beam welding process.

5. The method of claim 3, wherein the multi-part welding tool has a receptacle device, an insulation plate, and a compression plate.

6. The method of claim 5, wherein the receptacle device has a base plate having mutually spaced-apart position elements, the method further including:
 disposing the mutually spaced-apart position elements on the base plate; and
 receiving the cell pack in the receptacle device, anyone of the first and the second side facing the base plate.

7. The method of claim 5, wherein the method further includes:
 positioning the insulation plate in at least a portion of any one of the first side and the second side of the cell pack, the insulation plate having at least one clearance oriented for alignment with the portion to be connected with the at least one contacting device.

8. The method of claim 5, wherein the insulation plate is made from a plastic material.

9. The method of claim 5, wherein the method further includes:
 disposing the compression plate on the insulation plate to be aligned with the insulation plate, the compression plate having at least another clearance and being connected to the receptacle device using a screw connection.

10. The method of claim 5, wherein the compression plate is made from at least one of a metal and a metal alloy.

11. The method of claim 1, wherein the cell pack has two end plates, and the method further includes:
 positioning each end plate at a corresponding end of the plurality of electrochemical cell units; and
 coupling the two end plates to each other, the coupling securing the cell pack.

12. The method of claim 1, wherein each electrochemical cell unit of the plurality of electrochemical cell units has a cell carrier and a planar element, the method further including:
 disposing the at least two lithium-ion pouch cells in the cell carrier; and
 disposing the planar element in the cell carrier, the planar element being sandwiched between the at least two lithium-ion pouch cells.

13. A method for assembling an energy storage module comprising at least one contacting device and a plurality of electrochemical cell units, the at least one contacting device being comb-shaped and having a first plurality of teeth, the at least one contacting device having at least one busbar and at least one carrier, the at least one busbar and the at least one carrier being comb-shaped and having a second plurality of teeth and a third plurality of teeth, respectively, each electrochemical cell unit of the plurality of electrochemical cell units having at least two lithium-ion pouch cells, each of the at least two lithium-ion pouch cells having a first and a second terminal lug, each one of the first terminal lug and the second terminal lug having a first side and a second side opposite the first side, the method comprising:
- positioning the plurality of electrochemical cell units by placing at least one electrochemical cell unit next to another electrochemical cell unit to form a cell pack having a first side of the cell pack and second side of the cell pack opposite to each other, the first terminal lug and the second terminal lug being on the first side and the second side of the cell pack, respectively;
- coupling the at least one busbar to the at least one carrier, each tooth of the second plurality of teeth being aligned with one tooth of the third plurality of teeth, each pair of aligned teeth of the second plurality of teeth and the third plurality of teeth corresponding to one tooth of the first plurality of teeth of the at least one contacting device;
- push-fitting the at least one contacting device onto the first terminal lug and the second terminal lug, the push-fitting including:
  - receiving each of the first terminal lug and the second terminal lug between two neighboring teeth of the first plurality of teeth of the at least one contacting device, each of the first terminal lug and the second terminal lug contacting the corresponding two neighboring teeth of the first plurality of teeth; and
  - electrically connecting each one of the first side and the second side of the first terminal lug and the second terminal lug to the at least one contacting device;
- bending the first and second terminal lugs; and
- welding at least one of the first and second terminal lugs to the at least one contacting device.

14. The method of claim 13, wherein at least the second plurality of teeth being used to electrically connect the first terminal lug and the second terminal lug to the at least one contacting device.

15. A method for assembling an energy storage module comprising at least one contacting device and a plurality of electrochemical cell units, the at least one contacting device being comb-shaped and having a first plurality of teeth, the at least one contacting device having at least one busbar and at least one carrier, the at least one busbar and the at least one carrier being comb-shaped and having a second plurality of teeth and a third plurality of teeth, respectively, each electrochemical cell unit of the plurality of electrochemical cell units having at least two lithium-ion pouch cells, each of the at least two lithium-ion pouch cells having a first and a second terminal lug, each one of the first terminal lug and the second terminal lug having a first side and a second side opposite the first side, the method comprising:
- positioning the plurality of electrochemical cell units by placing at least one electrochemical cell unit next to another electrochemical cell unit to form a cell pack having a first side of the cell pack and a second side of the cell pack opposite to each other, the first terminal lug and the second terminal lug being on the first side and the second side of the cell pack, respectively; and
- coupling the at least one busbar to the at least one carrier, each tooth of the second plurality of teeth being aligned with one tooth of the third plurality of teeth, each pair of aligned teeth of the second plurality of teeth and the third plurality of teeth corresponding to one tooth of the first plurality of teeth of the at least one contacting device;
- push-fitting the at least one contacting device onto the first terminal lug and the second terminal lug, the push-fitting including:
  - receiving each of the first terminal lug and the second terminal lug between two neighboring teeth of the first plurality of teeth of the at least one contacting device, each one of the first side and the second side of the first terminal lug and the second terminal lug contacting the corresponding two neighboring teeth of the first plurality of teeth; and
  - electrically connecting each one of the first side and the second side of the first terminal lug and the second terminal lug to the at least one contacting device.

16. The method of claim 15, wherein each electrochemical cell unit of the plurality of electrochemical cell units has a cell carrier, and a planar element, the method further including:
- disposing the at least two lithium-ion pouch cells in the cell carrier; and
- disposing the planar element in the cell carrier, the planar element being sandwiched between the at least two lithium-ion pouch cells.

17. The method as claimed in claim 15, wherein the cell pack has two end plates, and the method further includes:
- positioning each end plate at a corresponding end of the plurality of electrochemical cell units; and
- coupling the two end plates to each other, the coupling securing the cell pack and the at least one contacting device.

* * * * *